(No Model.)

W. E. HARRIS.
ORE AMALGAMATOR.

No. 272,045.  Patented Feb. 13, 1883.

Witnesses:
Chas. Nio[?]
C. Sedgwick

Inventor:
W. E. Harris
by Munn & Co
Attorneys.

UNITED STATES PATENT OFFICE.

WILLIAM E. HARRIS, OF NEW YORK, N. Y.

ORE-AMALGAMATOR.

SPECIFICATION forming part of Letters Patent No. 272,045, dated February 13, 1883.

Application filed February 8, 1882. (No model.)

*To all whom it may concern:*

Be it known that I, WILLIAM EDWARD HARRIS, of the city, county, and State of New York, have invented a new and useful Improvement in Ore-Amalgamators, of which the following is a full, clear, and exact description.

Reference is to be had to the accompanying drawings, forming a part of this specification, in which similar letters of reference indicate correspoding parts in all the figures.

Figure 1:
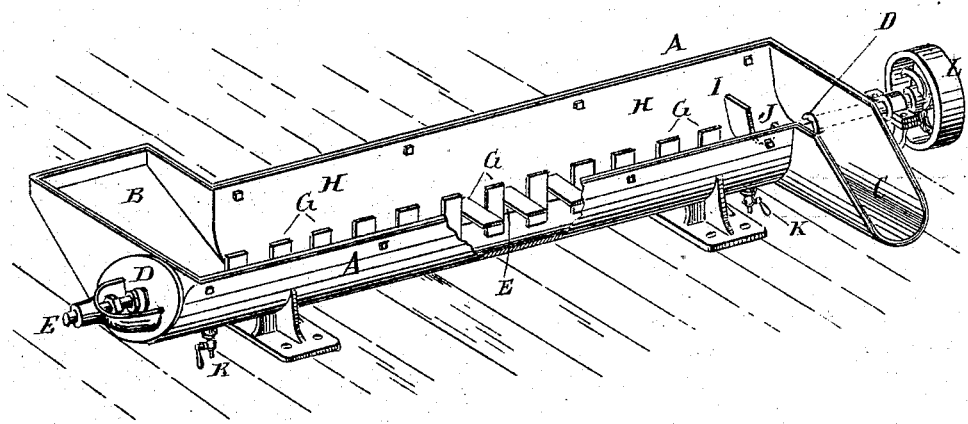
Figure 2:
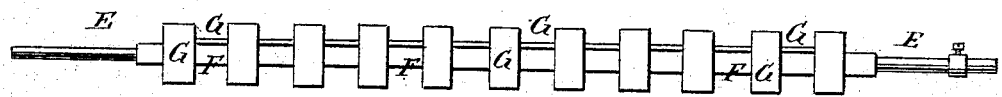
Figure 3:
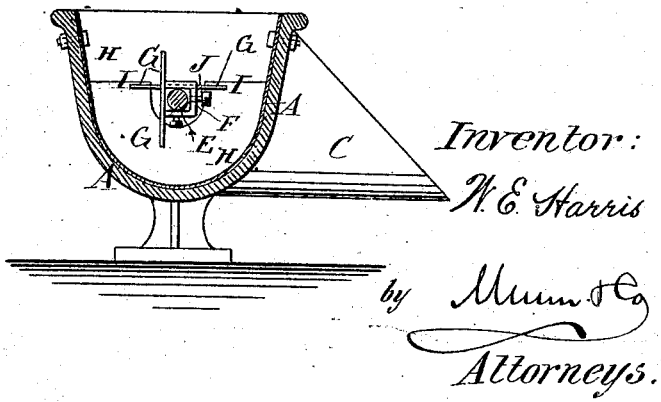

Figure 1 is a perspective view of my improvement, part being broken away. Fig. 2 is a plan view of the rotating amalgamated plates and their shaft. Fig. 3 is a sectional end elevation of the separator.

My invention relates to improvements in ore-separators; and it consists in the combination, with a trough interiorly faced with amalgamated plates, and provided with inlet and outlet spouts and a slotted partition, of a longitudinal shaft revolving in the trough, and provided with amalgamated plates arranged at right angles, as hereinafter more fully set forth.

A represents a trough, which is made with a semi-cylindrical bottom, and which may be of any desired length, width, and depth.

The trough A is closed at both ends, and with the side of the head end is connected an inclined spout, B, through which the material to be operated upon and the water are introduced from an ordinary separator or from any other desired source.

With the side of the tail end of the trough A is connected a spout, C, through which the water and refuse are allowed to flow into a sluice.

In the ends of the trough A, in the center of the circle of which the curved bottom of the said trough is a part, are formed openings in which are secured stuffing-boxes D.

E is a shaft which passes through and has a pulley, L, attached to one end, to receive a driving-belt from any convenient power. The shaft E is made square to receive sockets or keepers F, to which are attached amalgamated copper plates G, so arranged that each plate G will be at right angles with the adjacent plate or plates. The plates G are made narrow, and of such a length that their ends will nearly touch the curved inner surface of the trough A or the amalgamated copper plates H, attached to the said inner surface.

To the trough A, at a little distance from its tail end, is attached, or in it is formed, a partition, I, in the middle part of the upper edge of which is formed a slot, J, through which the shaft E passes, and which is made of such a size as to leave an opening below and at the sides of the said shaft, through which the water and refuse can flow out and escape through the spout C.

In the bottom of the trough A, at each end, is secured a faucet, K, through which the quicksilver and amalgam can be drawn off.

I am aware that an ore-separator lined with amalgamated plates and provided with stirrers, amalgamated on their outer surfaces, is not new, and I therefore lay no claim broadly to such, my invention being confined to the peculiar construction and arrangement of parts set forth in the claim.

Having thus described my invention, I claim as new and desire to secure by Letters Patent—

In an ore-amalgamator, the combination, with the trough A, lined with amalgamated plates H, and provided with the inlet and outlet spouts B C, and partition I, having central opening, J, of the shaft E, provided with amalgamated stirring-plates G, arranged at right angles to each other and adjustably secured to the shaft E, substantially as described, and for the purpose set forth.

WILLIAM EDWARD HARRIS.

Witnesses:
JAMES T. GRAHAM,
C. SEDGWICK.